(12) United States Patent
Walter et al.

(10) Patent No.: US 8,297,690 B2
(45) Date of Patent: Oct. 30, 2012

(54) MOTOR VEHICLE BODY

(75) Inventors: Siegfried Walter, Leonberg (DE);
Matthias Herntier, Wurmberg (DE);
Roberto Oggianu, Leonberg (DE);
Volker Brunner, Weissach (DE)

(73) Assignee: Dr. Ing. h.c.F. Porsche AG (DE), ( * ) Notice: Subject to any disclaimer, the term of this patent is extended or adjusted under 35 U.S.C. 154(b) by 511 days.

(21) Appl. No.: 12/612,760

(22) Filed: Nov. 5, 2009

(65) Prior Publication Data

US 2010/0117402 A1 May 13, 2010

(30) Foreign Application Priority Data

Nov. 8, 2008 (DE) .......................... 10 2008 056 501

(51) Int. Cl.
*B62D 25/08* (2006.01)
(52) U.S. Cl. ................... 296/204; 296/209; 296/187.09
(58) Field of Classification Search .................. 296/204, 296/181.4, 187.09, 187.1, 187.08, 193.07, 296/187.12, 193.09, 209
See application file for complete search history.

(56) References Cited

U.S. PATENT DOCUMENTS

| | | | |
|---|---|---|---|
| 2,954,998 A * | 10/1960 | Kushler et al. ................ 296/204 |
| 2,964,331 A * | 12/1960 | Sherman ........................ 280/790 |
| 4,045,075 A * | 8/1977 | Pulver ............................ 296/205 |
| 4,840,423 A * | 6/1989 | Maekawa ................... 296/203.02 |
| 5,074,587 A * | 12/1991 | Schwede et al. .............. 280/781 |
| 5,839,776 A * | 11/1998 | Clausen et al. ........... 296/187.03 |
| 7,270,366 B2 * | 9/2007 | Kamura et al. .......... 296/193.07 |
| 7,469,957 B1 * | 12/2008 | Boettcher ................ 296/193.07 |
| 7,883,113 B2 * | 2/2011 | Yatsuda ........................ 280/784 |
| 2010/0078968 A1 * | 4/2010 | Boettcher et al. ......... 296/193.07 |
| 2010/0171340 A1 * | 7/2010 | Yasuhara et al. ............... 296/205 |

FOREIGN PATENT DOCUMENTS

| | | |
|---|---|---|
| DE | 39 05 650 C1 | 1/1990 |
| DE | 100 59 261 A1 | 7/2001 |
| DE | 10 2004 016 188 A1 | 10/2005 |
| JP | 11192977 A * | 7/1999 |
| JP | 2008230419 A * | 10/2008 |
| JP | 2008230421 A * | 10/2008 |

* cited by examiner

*Primary Examiner* — Dennis Pedder
(74) *Attorney, Agent, or Firm* — Gerald E. Hespos; Michael J. Porco

(57) ABSTRACT

A motor vehicle body has at least two sills running laterally in a longitudinal direction of the vehicle. An auxiliary frame is provided in a region of a front axle and at least one strut is provided, the strut running between the auxiliary frame of the front axle and one of the two lateral sills. This makes it possible in particular to increase the natural frequency of a vehicle front end by structurally simple and also cost-effective measures.

8 Claims, 2 Drawing Sheets

MOTOR VEHICLE BODY

CROSS-REFERENCE TO RELATED APPLICATION

This application claims the priority, under 35 U.S.C. §119, of German application DE 10 2008 056 501.6, filed Nov. 8, 2008; the prior application is herewith incorporated by reference in its entirety.

BACKGROUND OF THE INVENTION

Field of the Invention

The present invention relates to a motor vehicle body with at least two sills running laterally in the longitudinal direction of the vehicle. The invention also relates to a motor vehicle having a motor vehicle body of this type.

German patent DE 39 05 650 C1, corresponding to U.S. Pat. No. 5,074,587, discloses a motor vehicle body which is of the type in question and, in addition to the lateral sills running in the longitudinal direction of the vehicle, has front and rear longitudinal members which are offset with respect to the central longitudinal axis of the vehicle and are located in the forward structure of the vehicle and in the vehicle rear. In this case, struts are fixed to the underside of the motor vehicle body, the struts being fastened at one end to a lateral longitudinal member and at their other end again to the underside of the motor vehicle body, one strut being guided by the two lateral longitudinal members into the forward structure of the vehicle and/or one strut being guided by the two lateral longitudinal members into the vehicle rear. In this case, each strut is oriented at approximately an angle of 45° with respect to the longitudinal axis of the vehicle. This is intended to enable the strength of the body against torsional vibrations to be increased and, as a result, the level of the maximum torsional vibration amplitudes to be reduced.

Published, German patent application DE 100 59 261 A1 discloses a motor vehicle body which is reinforced by the provision of prestressed tension elements which are inclined with respect to the inertia axis of the vehicle body, the inertia axis being crucial in the case of torsional vibrations in the longitudinal direction of the vehicle. The tension elements here can be configured as cables. This is intended to increase the natural frequency in the case of torsional vibrations about the longitudinal axis, in particular in the case of open motor vehicles.

Finally, published, German patent application DE 10 2004 016 188 A1 discloses an auxiliary frame on a motor vehicle for receiving and/or supporting one or more vehicle components of the front end region of the motor vehicle. For this purpose, at least one front and one rear cross member are provided, the cross members, which are at a distance from each other, being fixedly connected by one or more connecting elements to form a frame-shaped constructional unit and at the same time fastening the latter to the motor vehicle body. This is intended to substantially minimize a disadvantageous deformation of a footwell or of a floor as a result of a crash, in particular a head-on or offset crash.

SUMMARY OF THE INVENTION

It is accordingly an object of the invention to provide a motor vehicle body which overcomes the above-mentioned disadvantages of the prior art devices of this general type, which is an improved or at least a different embodiment by which the natural frequency of a vehicle front end can be increased cost-effectively.

With the foregoing and other objects in view there is provided, in accordance with the invention a motor vehicle body. The motor vehicle body contains at least two lateral sills running laterally in a longitudinal direction of a vehicle, an auxiliary frame disposed in a region of a front axle, and at least one strut running between the auxiliary frame and one of the two lateral sills.

The invention is based on the general concept, in the case of a motor vehicle body with an auxiliary frame in the region of a front axle and at least two lateral sills running in the longitudinal direction of the vehicle, of providing a respective strut on both sides of the motor vehicle body between the auxiliary frame of the front axle and the associated sill. The struts here can be configured as simple reinforcement elements which are easy to fit and are made, for example, from plastic or metal and, as a result, can be produced cost-effectively and, in particular if made from plastic, can be optimized in terms of weight, which is of great advantage in particular in sports car manufacturing. The strut provided according to the invention makes it possible for the natural frequency of the vehicle front end to be significantly increased, as a result of which the latter can be reinforced, in particular in relation to torsional vibrations. The use of such struts is of great advantage in particular in the case of open motor vehicles, i.e., for example, in the case of convertibles, but also brings about an increase in the natural frequency of the vehicle front end in the case of motor vehicles of closed configuration.

In a further advantageous embodiment of the solution according to the invention, the strut is of a strip-shaped configuration or has a U-shaped cross-sectional profile. A strip-shaped configuration is suitable in particular if the strut is primarily intended to absorb tensile loads. In comparison thereto, a strut having a U-shaped cross-sectional profile can be used if the strut has to absorb compressive forces. Furthermore, such a U-shaped cross-sectional profile has a comparatively high bending moment, i.e. a high moment of resistance to bending, as a result of which buckling under compression loading should not be expected. Of course, a C-shaped cross-sectional profile can be used instead of the U-shaped cross-sectional profile.

It goes without saying that the features mentioned above and those which have yet to be explained below can be used not only in the respectively stated combination but also in different combinations or on their own without departing from the scope of the present invention.

Preferred exemplary embodiments of the invention are illustrated in the drawings and are explained in more detail in the description below where the same reference numbers relate to identical or similar or functionally identical components.

Other features which are considered as characteristic for the invention are set forth in the appended claims.

Although the invention is illustrated and described herein as embodied in a motor vehicle body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
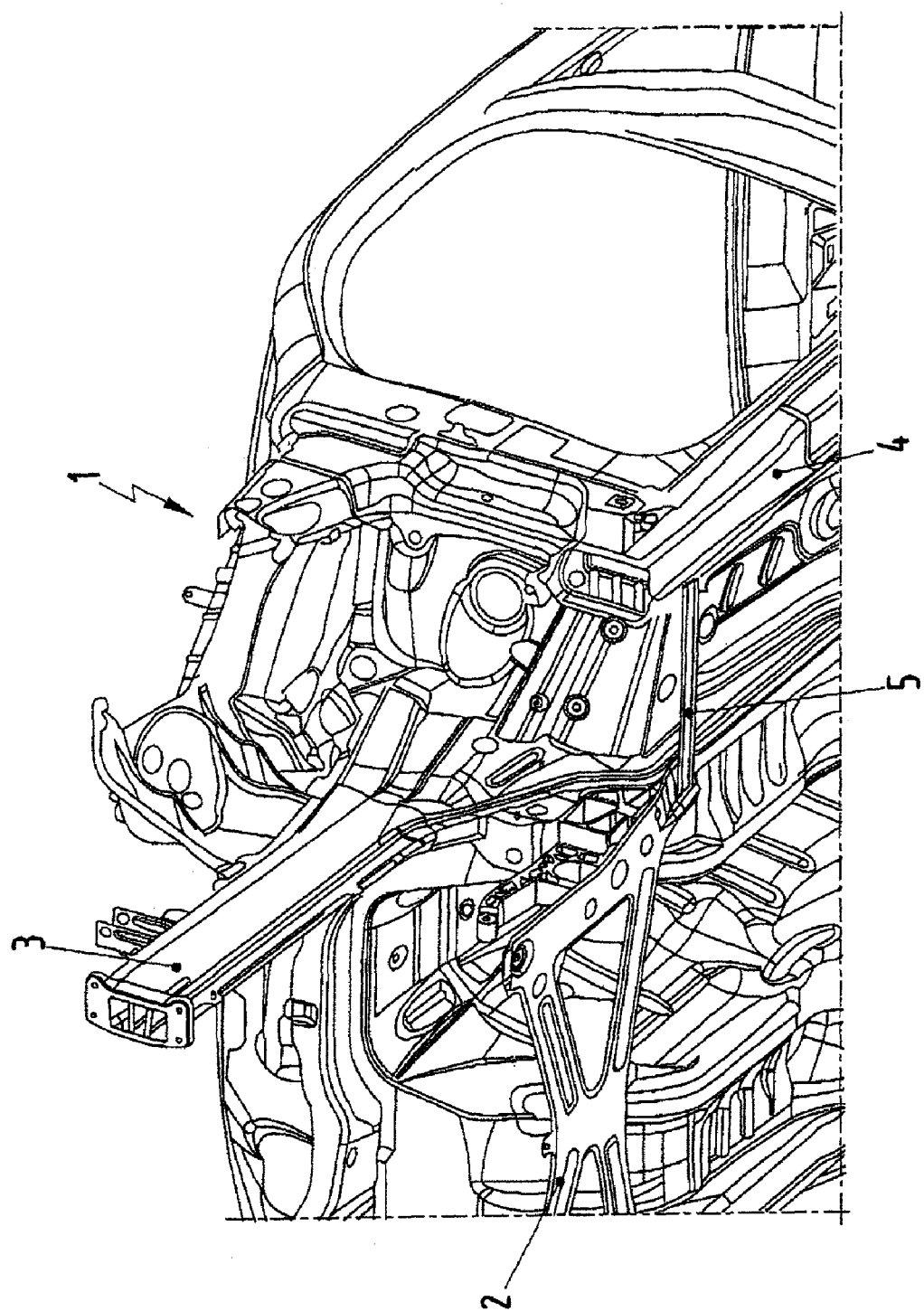
FIG. 1 is a diagrammatic, perspective view from below of a motor vehicle body according to the invention.

Referring now to the figures of the drawing in detail and first, particularly, to FIG. 1 thereof, there is shown a motor vehicle body 1 according to the invention which has, in a region of a front axle, an auxiliary frame 2 which is joined to a longitudinal member 3. Furthermore, "sills" 4 are provided in a lateral region of a passenger compartment and are likewise arranged such that they run in a longitudinal direction of the vehicle. According to the invention, a strut 5 is provided between the auxiliary frame 2 and the sill 4, the strut 5 serving to increase the natural frequency of a vehicle front end and to make the motor vehicle body 1 more rigid overall as a result.

The strut 5 is fixedly connected, in particular bolted, at one end to the sill 4 and at the other end to the auxiliary frame 2. In order to be able to effectively carry out its reinforcing function, the strut 5 preferably has a U-shaped or C-shaped cross-sectional profile, it also being conceivable for the strut 5 to be of a strip-shaped configuration if it is primarily subjected to tension loadings. By use of the C-shaped or U-shaped configuration, the strut 5 has a high moment of resistance to bending and is therefore suitable also for transmitting compression loadings without any problem. Since two lateral sills 4 are customarily provided on each motor vehicle body 1, two struts 5 are customarily also provided according to the invention per motor vehicle body 1.

Figure 2:
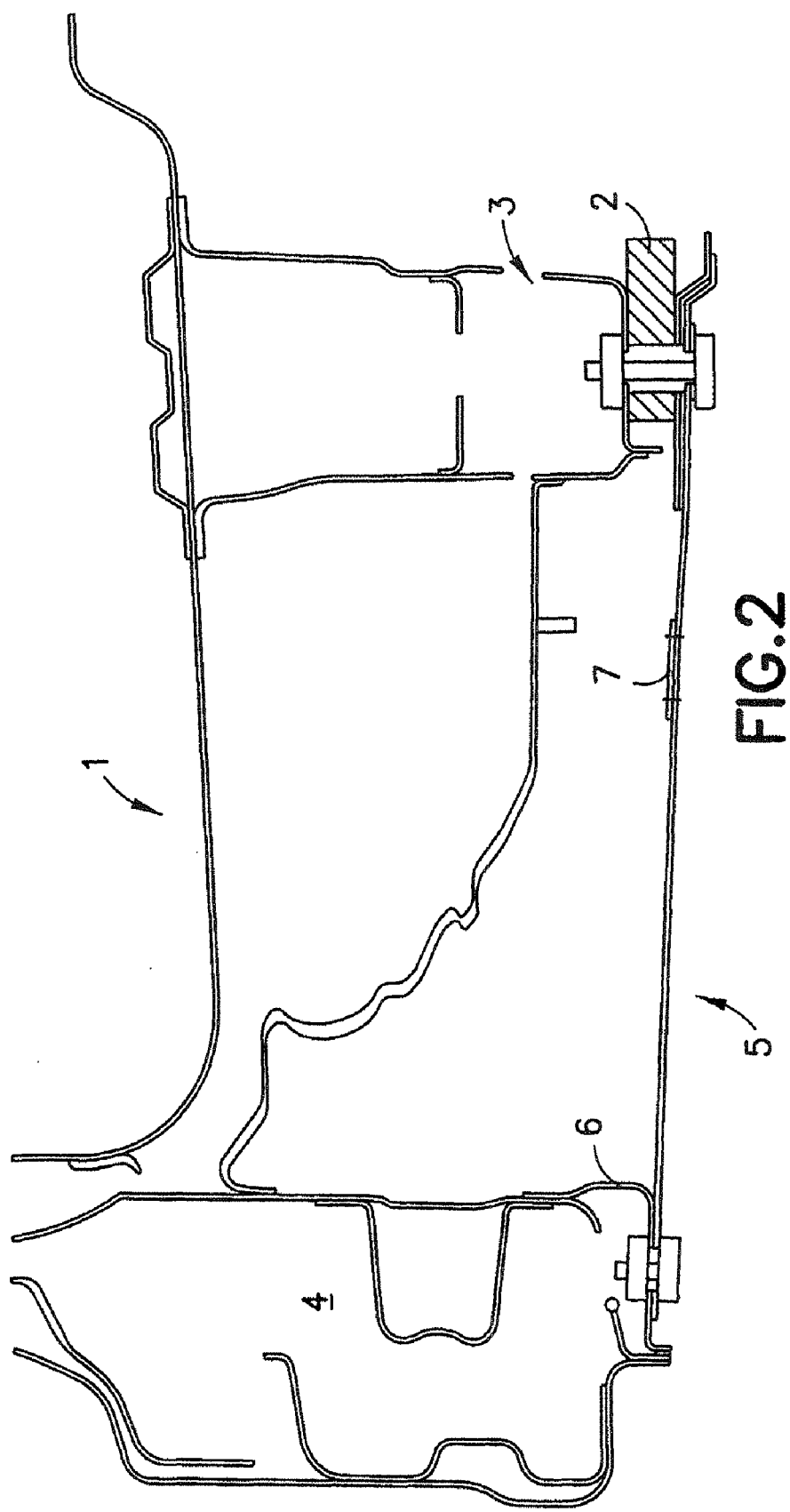
FIG. 2 is a sectional view through the motor vehicle body in a region of a strut according to the invention.

Looking at FIG. 2, it can be seen that the strut 5 is indirectly bolted to the sill 4 via a bracket 6. The bracket 6, for its part, can be fixedly connected to the sill 4, for example via a suitable joining process, such as welding or soldering. Furthermore, the strut 5 can be connected to a non-illustrated wheelhouse inner panel via a corresponding holder 7. Looking at the right part of FIG. 2, it can be seen that the strut 5 is indirectly connected, in particular bolted, to the longitudinal member 3 via the auxiliary frame 2. The strut 5 preferably runs here substantially transversely with respect to the longitudinal direction of the vehicle, an oblique arrangement with respect to the longitudinal direction of the vehicle also being conceivable.

With the strut 5 according to the invention, the natural frequency of the vehicle front end can be increased in a structurally simple and at the same time cost-effective manner, which contributes to a significant increase in the ride comfort in particular in the case of open motor vehicles, such as, for example, convertibles, but also in the case of closed motor vehicles. The struts 5 can generally be formed from all suitable materials, such as, in particular, plastic or metal. Of course, other materials are also suitable for this, such as, for example, fiber composite materials, in particular carbon fiber composite materials, which are of great advantage, particularly in sports vehicle manufacturing, owing to their low weight and their high degree of rigidity and strength.

The invention claimed is:

1. A motor vehicle body, comprising:
    at least two lateral sills running in a longitudinal direction of a vehicle;
    an auxiliary frame disposed in a region of a front axle;
    at least one strut running between said auxiliary frame and one of said two lateral sills; and
    a longitudinal member, said strut being connected indirectly and fixedly to said longitudinal member via said auxiliary frame.

2. The motor vehicle body according to claim 1, wherein said strut has one of a strip-shaped design and a U-shaped cross-sectional profile.

3. The motor vehicle body of claim 1, further comprising a bracket, said strut being indirectly fixedly connected to one of said sills via said bracket.

4. The motor vehicle body of claim 3, wherein said bracket is welded to said one sill.

5. The motor vehicle body according to claim 1, wherein said strut runs in one of a transverse direction of the vehicle and an oblique direction with respect to the longitudinal direction of the vehicle.

6. The motor vehicle body according to claim 1, wherein said strut is bolted to said one sill and said auxiliary frame.

7. A motor vehicle body comprising:
    at least two lateral sills running in a longitudinal direction of a vehicle;
    an auxiliary frame disposed in a region of a front axle;
    at least one strut running between said auxiliary frame and one of said two lateral sills; and
    a longitudinal member, said strut is bolted to said longitudinal member via said auxiliary frame.

8. The motor vehicle body of claim 1, further comprising a bracket, said strut is bolted to one of said sills via said bracket.

* * * * *